US011057862B2

(12) United States Patent
Scharf et al.

(10) Patent No.: US 11,057,862 B2
(45) Date of Patent: Jul. 6, 2021

(54) WI-FI RADAR DETECTION USING SYNCHRONIZED WIRELESS ACCESS POINT

(71) Applicant: CELENO COMMUNICATIONS (ISRAEL) LTD., Raanana (IL)

(72) Inventors: Alexander Scharf, Kfar-Saba (IL); Albert Rapaport, Shoham (IL); Hanoch Yokev, Kiryat Tivon (IL); Tsahi Tal, Tel-Mond (IL)

(73) Assignee: CELENO COMMUNICATIONS (ISRAEL) LTD., Raanana (IL)

( * ) Notice: Subject to any disclaimer, the term of this patent is extended or adjusted under 35 U.S.C. 154(b) by 0 days.

(21) Appl. No.: 16/550,232

(22) Filed: Aug. 25, 2019

(65) Prior Publication Data
US 2020/0112939 A1 Apr. 9, 2020

Related U.S. Application Data

(60) Provisional application No. 62/722,911, filed on Aug. 26, 2018.

(51) Int. Cl.
H04W 64/00 (2009.01)
G01S 7/527 (2006.01)
(Continued)

(52) U.S. Cl.
CPC ........... H04W 64/006 (2013.01); G01S 7/527 (2013.01); G01S 13/003 (2013.01); G01S 13/04 (2013.01);
(Continued)

(58) Field of Classification Search
CPC ..... H04W 84/12; H04W 64/00; H04W 24/08; H04W 4/029; H04W 72/085; G01S 13/56
See application file for complete search history.

(56) References Cited

U.S. PATENT DOCUMENTS 7,054,296 B1 5/2006 Sorells et al.
7,072,390 B1 7/2006 Sorells et al.
(Continued)

FOREIGN PATENT DOCUMENTS

CN 103308934 A 9/2013
EP 2696332 A1 2/2014
(Continued)

OTHER PUBLICATIONS

International Application # PCT/IB2019/061355 search report dated Mar. 18, 2020.
(Continued)

Primary Examiner — Jung H Park
(74) Attorney, Agent, or Firm — Kligler & Associates Patent Attorneys Ltd

(57) ABSTRACT

A Wireless Local-Area Network (WLAN) access point includes a WLAN transmitter, a WLAN receiver, and a processor. The WLAN transmitter is configured to transmit WLAN packets via one or more transmit antennas, and to send a timing-synchronization signal over an internal interface. The WLAN receiver is configured to receive, via one or more receive antennas, echo packets including reflections from an object of a selected subset of the WLAN packets transmitted by the WLAN transmitter, to receive the timing-synchronization signal from the WLAN transmitter over the internal interface, and to time-synchronize the echo packets and the corresponding WLAN packets using the timing-synchronization signal. The processor is configured to estimate one or more parameters of the object based on the time-synchronized echo packets and WLAN packets, and to output the estimated parameters to a user.

16 Claims, 5 Drawing Sheets

(51) Int. Cl.
| | |
|---|---|
| G01S 13/00 | (2006.01) |
| G01S 13/04 | (2006.01) |
| G01S 13/56 | (2006.01) |
| H04L 12/26 | (2006.01) |
| H04W 4/02 | (2018.01) |
| H04W 48/20 | (2009.01) |
| H04W 56/00 | (2009.01) |
| H04W 72/08 | (2009.01) |
| H04W 84/12 | (2009.01) |
| H04W 88/10 | (2009.01) |

(52) U.S. Cl.
CPC .......... *G01S 13/56* (2013.01); *H04L 43/0829* (2013.01); *H04W 4/027* (2013.01); *H04W 48/20* (2013.01); *H04W 56/0025* (2013.01); *H04W 64/003* (2013.01); *H04W 72/082* (2013.01); *H04W 84/12* (2013.01); *H04W 88/10* (2013.01)

(56) References Cited

U.S. PATENT DOCUMENTS

| | | | |
|---|---|---|---|
| 8,737,279 | B1 | 5/2014 | Aweya et al. |
| 8,897,152 | B1 | 11/2014 | Caceres et al. |
| 9,474,041 | B1 | 10/2016 | Zhang et al. |
| 9,686,164 | B1 | 6/2017 | Paczkowski et al. |
| 9,971,414 | B2 | 5/2018 | Gollakota et al. |
| 10,031,209 | B2 | 7/2018 | Sen et al. |
| 2006/0109780 | A1 | 5/2006 | Fechtel |
| 2009/0022157 | A1 | 1/2009 | Rumbaugh et al. |
| 2010/0130873 | A1 | 5/2010 | Yuen et al. |
| 2011/0287778 | A1 | 11/2011 | Levin et al. |
| 2014/0187259 | A1 | 7/2014 | Kakani et al. |
| 2015/0270867 | A1 | 9/2015 | Young et al. |
| 2016/0044695 | A1 | 2/2016 | Gunner |
| 2016/0259041 | A1* | 9/2016 | Tan .................... G01S 13/003 |
| 2017/0034507 | A1* | 2/2017 | Harris .................. H04N 17/004 |
| 2017/0086202 | A1* | 3/2017 | Chen .................... H04W 72/082 |
| 2017/0188227 | A1 | 6/2017 | Kang |
| 2017/0212210 | A1 | 7/2017 | Chen et al. |
| 2018/0081030 | A1 | 3/2018 | McMahon et al. |
| 2018/0115439 | A1 | 4/2018 | Bhatti et al. |
| 2018/0121226 | A1 | 5/2018 | Liu |
| 2019/0120952 | A1 | 4/2019 | Kim |
| 2020/0229126 | A1 | 7/2020 | Soriaga et al. |
| 2020/0333472 | A1 | 10/2020 | Marshall et al. |

FOREIGN PATENT DOCUMENTS

| | | |
|---|---|---|
| WO | 2016065368 A1 | 4/2016 |
| WO | 2018222268 A1 | 12/2018 |

OTHER PUBLICATIONS

International Application # PCT/IB2019/061374 search report dated Apr. 27, 2020.
Banin et al., "Reference Positioning Engine & Measurements Database for Wi-Fi RTT (FTM) Positioning", Intel Corporation, pp. 1-13, Aug. 1, 2018.
Gunther et al., "Measuring Round Trip Times to Determine the Distance between WLAN Nodes", International Conference on Research in Networking, pp. 768-779 , May 2, 2005.
Chen et al., "Doppler Based Detection of Multiple Targets in Passive Wi-Fi Radar Using Underdetermined Blind Source Separation", International Conference on Radar (RADAR), pp. 1-6, Aug. 27, 2018.
Chabriel et al., "Passive Covert Radars using CP-OFDM signals. A new efficient method to extract targets echoes", International Conference on Radar (RADAR), pp. 1-6, Oct. 13, 2014.
Huang et al., "Feasibility and Limits of Wi-Fi Imaging", SenSys '14: Proceedings of the 12th ACM Conference on Embedded Network Sensor System, pp. 266-279, Nov. 3, 2014.
IEEE P802.11ax™/D2.3, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, IEEE Computer Society, pp. 1-660, Apr. 2018.
Rs et al., "Design of Inverse Moving Target Indicator (IMTI) algorithm for arbitrary filter weights", 9th International Radar Symposium India—(IRSI—), pp. 1-4, Dec. 10-14, 2013.
Gurbuz et al., "Radar Detection and Identification of human Signatures using Moving Platforms", Thesis in partial fulfillment of the requirements for the Degree Doctor of Philosophy of Philosophy in the School of Electrical and Computer Engineering, Georgia Institute of Technology, pp. 1-127, Dec. 2009.
Sit, "MIMO OFDM Radar-Communication System with Mutual Interference Cancellation", KIT Scientific Publishing, pp. 1-262, year 2017.
Kim et al., "Human Detection and Activity Classification Based on Micro-Doppler Signatures Using Deep Convolutional Neural Networks", IEEE Geoscience and Remote Sensing Letters, vol. 13, No. 1, pp. 8-12, Jan. 2016.
Cao, "A CFAR Algorithm for Radar Detection Under Severe Interference", Proceedings of the 2004 Intelligent Sensors, Sensor Networks and Information Processing Conference, pp. 167-172, Dec. 14-17, 2004.
International Application # PCT/IB2019/057132 search report dated Dec. 4, 2019.
U.S. Appl. No. 16/726,853 Office Action dated Feb. 2, 2021.

\* cited by examiner

WI-FI RADAR DETECTION USING SYNCHRONIZED WIRELESS ACCESS POINT

CROSS-REFERENCE TO RELATED APPLICATIONS

This application claims the benefit of U.S. Provisional Patent Application 62/722,911, filed Aug. 26, 2018, whose disclosure is incorporated herein by reference.

TECHNICAL FIELD

Embodiments described herein relate generally to wireless networks, and particularly to devices and methods for wireless detection of physical objects within a wireless network environment.

BACKGROUND

Techniques that utilize wireless communication signals to identify human motion based on reflection of the wireless signals from the human body were previously proposed in the patent literature. For example, PCT Patent Application Publication WO2018/222268 describes techniques and apparatuses that enable radar modulations for radar sensing using a wireless communication chipset. A controller initializes or controls modulations performed by the wireless communication chipset. In this way, the controller can enable the wireless communication chipset to perform modulations for wireless communication or radar sensing. In some cases, the controller can further select a wireless communication channel for setting a frequency and a bandwidth of a radar signal, thereby avoiding interference between multiple radar signals or between the radar signal and a communication signal. In other cases, the controller can cause the wireless communication chipset to modulate a signal containing communication data using a radar modulation. This enables another device that receives the signal to perform wireless communication or radar sensing. By utilizing these techniques, the wireless communication chipset can be used for wireless communication or radar sensing.

As another example, U.S. Patent Application Publication 2017/0086202 describes a system and method for object detection in a wireless network. A wireless communications device receives a first set of wireless signals on a first frequency band, and generates a first interference profile for the wireless network based on signal interference in the first set of wireless signals. The wireless communications device further receives a second set of wireless signals on a second frequency band, and generates a second interference profile for the wireless network based on signal interference in the second set of wireless signals. The wireless communications device then detects the presence of an object in the wireless network based at least in part on the first interference profile and the second interference profile. In an embodiment, a backscattering object detection system is provided that includes one or more wireless devices that performs object detection based on signal interference in backscattered wireless signals that are transmitted by the wireless devices and subsequently reflected back to the wireless devices by an interfering object.

U.S. Pat. No. 9,971,414 describes examples of systems, devices, and methods that can provide for gesture recognition. Wireless communication signals are received from sources in an environment (e.g. cellular telephones, computers, etc.). Features of the wireless communication signals (e.g., Doppler shifts) are extracted and utilized to identify gestures. The use of wireless communication signals accordingly makes possible gesture recognition in a whole-home environment that identifies gestures performed through walls or other obstacles.

SUMMARY

An embodiment of the present invention provides a Wireless Local-Area Network (WLAN) access point including a WLAN transmitter, a WLAN receiver, and a processor. The WLAN transmitter is configured to transmit WLAN packets via one or more transmit antennas, and to send a timing-synchronization signal over an internal interface. The WLAN receiver is configured to receive, via one or more receive antennas, echo packets including reflections from an object of a selected subset of the WLAN packets transmitted by the WLAN transmitter, to receive the timing-synchronization signal from the WLAN transmitter over the internal interface, and to time-synchronize the echo packets and the corresponding WLAN packets using the timing-synchronization signal. The processor is configured to estimate one or more parameters of the object based on the time-synchronized echo packets and WLAN packets, and to output the estimated parameters to a user.

In some embodiments, the processor is configured to estimate a distance between the access point and the object by (a) for a given WLAN packet transmitted by the WLAN transmitter, identifying (i) an echo packet received from the target in response to the given WLAN packet, and (ii) a direct leakage of the given WLAN packet from the WLAN transmitter to the WLAN receiver, (b) measuring a time delay between the echo packet and the direct leakage, and (c) estimating the distance based on the time delay.

In some embodiments, the WLAN access point further includes a frequency source configured to generate at least one frequency-reference signal, and to provide the frequency-reference signal to both the WLAN transmitter and the WLAN receiver, wherein the WLAN transmitter and the WLAN receiver are configured to frequency-synchronize to one another using the frequency-reference signal.

In an embodiment, the frequency source is configured to sweep the at least one frequency-reference signal and estimate one or more parameters of the object based on the at least one swept frequency-reference signal.

In another embodiment, the WLAN packets transmitted by the WLAN transmitter include both communication packets and channel-sounding packets, and the processor is configured to estimate the parameters of the object based on the echo packets corresponding to the channel-sounding packets.

In some embodiments, the WLAN transmitter is configured to transmit the communication packets interleaved between the channel-sounding packets. In other embodiments, the WLAN transmitter is configured to transmit a sequence of the channel-sounding packets at regular time intervals, and the processor is configured to estimate the parameters of the object by applying a frequency-domain transform to the echo packets corresponding to the sequence of the channel-sounding packets.

In an embodiment, the WLAN receiver is configured to receive WLAN communication packets from one or more WLAN stations (STAs), interleaved between the echo packets.

In some embodiments, the one or more parameters of the object include at least one parameter of the object, selected from the group of parameters consisting of range, direction and velocity.

There is additionally provided, in accordance with an embodiment of the present invention, a method including transmitting WLAN packets via one or more transmit antennas, and sending a timing-synchronization signal over an internal interface. Echo packets that include reflections from an object are received, of a selected subset of the WLAN packets transmitted by the WLAN transmitter and the timing-synchronization signal, and time-synchronizing the echo packets and the corresponding WLAN packets using the timing-synchronization signal. One or more parameters of the object are estimated based on the time-synchronized echo packets and WLAN packets, and outputting the estimated parameters to a user.

These and other embodiments will be more fully understood from the following detailed description of the embodiments thereof, taken together with the drawings in which:

DETAILED DESCRIPTION OF EMBODIMENTS

Overview

Figure 1:
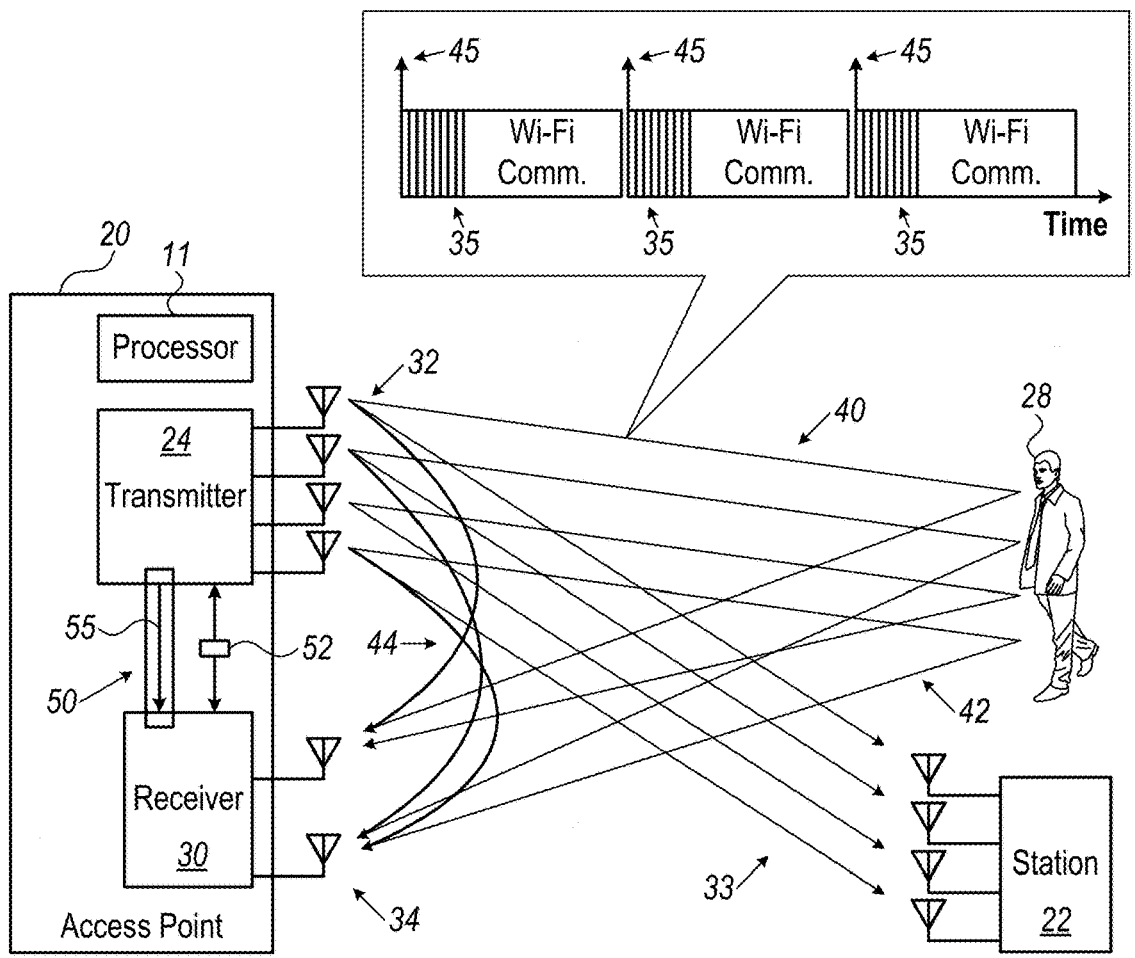
FIG. 1 is a block diagram that schematically illustrates a wireless access point (AP) that is further configured as a Wi-Fi radar, in accordance with an embodiment that is described herein.

An access point (AP) is a device that creates a wireless local area network (WLAN) in a designated area, such as inside a building. An AP typically transmits and receives wireless communication signals to and from WLAN stations (e.g., smartphones, laptops) in the designated area. A common communication standard in use with APs is the IEEE 802.11 standard family for Wi-Fi communication using ultra-high radio frequencies, typically between 1 GHz and 10 GHz.

Embodiments of the present invention that are described hereinafter provide AP devices which, on top of their standard use, function as Wi-Fi radar to detect location and movements of physical objects, such as a human subject, within a designated area (i.e., in the surroundings of the AP).

In radar mode, the disclosed AP devices transmit sequences of Wi-Fi channel-sounding packets, e.g., Null Data Packets (NDPs) such as 802.11AX NDP packets, and receive respective sequences of NDPs, also named hereinafter "echoes," that are physically reflected or scattered by objects in the designated area. The embodiments described herein refer mainly to NDPs by way of example. Generally, however, any other suitable type of WLAN packets, channel-sounding packets or otherwise, can be used for radar processing.

To estimate a range (i.e., a distance) from the AP to a target that causes the echoes, the disclosed APs include synchronization circuitries, so that the same AP device that makes the transmission can analyze the synchronously received echo signals, as described below. In some embodiments, the circuitries for transmission, reception, and synchronization are integrated on the same chip inside the AP, in order to improve synchronization accuracy.

In some embodiments, at the beginning of a transmission of an NDP sequence, a timing-synchronization signal is sent from the WLAN transmitter of the AP to the receive circuitry of the AP, typically via an electrical interface between them. A processor in the AP uses the timing-synchronization signal to identify a reference time at which the sequence of transmitted packets started, so as to relate each echo to the transmitted packet that generates the echo (e.g., to establish a one-to-one correspondence between a sequence of indexed transmitted packets, $\{Tr_1, Tr_2, \ldots Tr_K\}$, and a respectively indexed sequence of the received echoes, $\{E_1, E_2, \ldots E_K\}$). Subsequently, a time at which leakage of a given transmitted packet, $Tr_j$, is measured by the receiver is subtracted from a time at which the respective echo of that packet, $E_j$, was measured, and the processor estimates a range from the AP to a target that generated the echo.

In the present context, the term "leakage" refers to a signal that propagates directly from the AP's transmit antenna (or antennas) to the AP's receive antenna (or antennas). The AP uses the leakage of a given transmitted packet as a reference for measuring the round-trip delay of the given transmitted packet to the target and back.

The time-synchronized NDP sequences are used for channel estimation (estimation of the channel response), e.g., for estimation of communication quality, regardless of their extra use for radar detection. In some embodiments, NDP sequences are only sent when communication load enables dedicating time windows to perform channel estimations, typically at sub-second intervals. Thus, the radar detection functionality of the disclosed APs does not interfere with its regular WLAN functioning.

The NDP packets are transmitted by one or more transmit antennas of the AP. The echo packets are received via one or more receive antennas of the AP. The transmit antennas and receive antennas may be the same, or different, antennas.

An echo can result from a human and/or from objects such as walls, doors, and others. Humans are considered a difficult target to detect because they have a small radar cross section (RCS) and may easily be masked by surroundings that possess a higher RCS. To distinguish humans from their surroundings, the disclosed technique applies the Doppler effect. Human motion typically generates very low Doppler shifts (also termed hereinafter "micro-Doppler signatures"), in the range of a few tens to several hundreds of hertz. Thus, humans often fall below the minimum detectable velocity in Doppler processing.

To overcome this problem and identify human movement, the disclosed AP devices transmit sequences of NDPs in which the NDPs are equally-spaced in time, i.e., at regular time intervals. Such NDP sequences are also named hereinafter "coherent NDP sequences." Channel estimation of the echoes includes spectral analysis of the coherent NDP sequences, so as to identify micro-Doppler shifts. The disclosed AP receive circuitry may include a dedicated circuitry for performing frequency-domain transform (e.g., FFT), and/or a processor, which are configured to perform the spectral analysis. The AP may transmit NDP sequences having a particular number of NDP packets (e.g., a power of 2, such as 2048), and particular repetition rate and amplitude that are optimized for radar detection.

The micro-Doppler signature is typically time-varying and can be clearly observed in a joint time-frequency domain. Human identification may further be assisted by correlating, in advance, at least some monitored human activities with unique micro-Doppler signatures that they produce (e.g., human falls).

Further to the use of coherent sequences of packets, carrier frequency drift and/or jitter between the transmit and receive circuitries should be avoided (i.e., be zeroed) to be able to measure the very low Doppler shifts. In some embodiments, the carrier frequency drift and/or jitter, which are typically in a range of 10 KHz-100 KHz, are zeroed by driving an RF transmit circuitry and an RF receive circuitry of the AP with an identical RF clock signal (i.e., by having a common RF frequency-reference signal).

Typically, the processor in the AP is programmed in software containing a particular algorithm that enables the processor to conduct each of the processor-related steps and functions outlined above.

The disclosed techniques provide, to APs, physical monitoring capabilities using WLAN signals on top of their traditional usage in WLAN applications.

System Description

FIG. 1 is a block diagram that schematically illustrates a wireless communication access point (AP) 20 that is further configured as a Wi-Fi radar, in accordance with an embodiment that is described herein. In the present example, AP 20 operates in accordance with an IEEE Standard of the 802.11 family. As seen, AP device 20 communicates with one or more stations (STA), such as STA 22. STA 22 is also commonly referred to as a "user device" or a "client device."

AP 20 comprises one or more transmit antennas 32 and one or more receive antennas 34. The transmit antennas and receive antennas may be the same, or different, antennas. Antennas 32 are sometimes referred to as a beamforming array, although the beamforming operation is typically performed on the signals that are provided to the antennas. In the downlink direction, the AP typically transmits one or more beam-formed data transmissions, referred to as data streams, on directional transmission beams 33 that are directed toward the STA(s) intended to receive the data streams. The data streams are also referred to as "spatial streams" and may be provided to the AP by an external host computer (not shown) or generated internally within AP 20.

In order to transmit a data stream to a given STA, AP generates a corresponding signal for simultaneous transmission via multiple antennas 32. AP 20 comprises a WLAN transmitter 24 comprising a beamforming module (not shown) that applies, to the signal, a respective (complex valued) weight per each transmit antenna. The set of weights is selected so as to produce a directional transmission beam 33 that is directed, for example, toward the STA.

In the uplink direction, AP 20 receives via antennas 32, in a WLAN receiver 30, uplink transmissions (not shown) from one or more client devices, such as STA 22, and extracts information sent from the client devices to the AP.

In radar mode, WLAN receiver 30 receives echoes 42 of transmission beams 40, also termed hereinafter "echo taps." An echo tap has a time delay due to the accumulated propagation duration of beam 40 to human 28 and of its echo 42 back to the receiver. In order to perform Wi-Fi radar detection, WLAN transmitter 24 and WLAN receiver 30 are synchronized in time by a timing-synchronization signal: at the beginning of each transmission of an NDP sequence 35 (seen in inset 25), WLAN transmitter 24 sends a timing-synchronization signal 45 to WLAN receiver 30 of AP 20. The timing-synchronization signal is applied by a synchronization circuitry 50 over an electrical interface 55.

As further seen in an inset 25, NDP sequences 35 are sent by WLAN transmitter 30 only when allowed by the regular communication stream load, i.e., sent between sequences carrying WLAN communication. In an embodiment, the WLAN transmitter is configured to transmit the communication packets interleaved between the channel-sounding packets, and the WLAN receiver is configured to receive WLAN communication packets from one or more WLAN stations (STAs), interleaved between the echo packets.

WLAN transmitter 30 of AP 20 transmits NDP sequences without beamforming for the purpose of channel estimation, and therefore NDP sequences 35 are transmitted more or less omnidirectionally. NDP sequences 35 and the respective sequences of echoes (not shown) are analyzed by a processor 11 of AP 20 for performing radar detection of a human 28.

Figure 4:
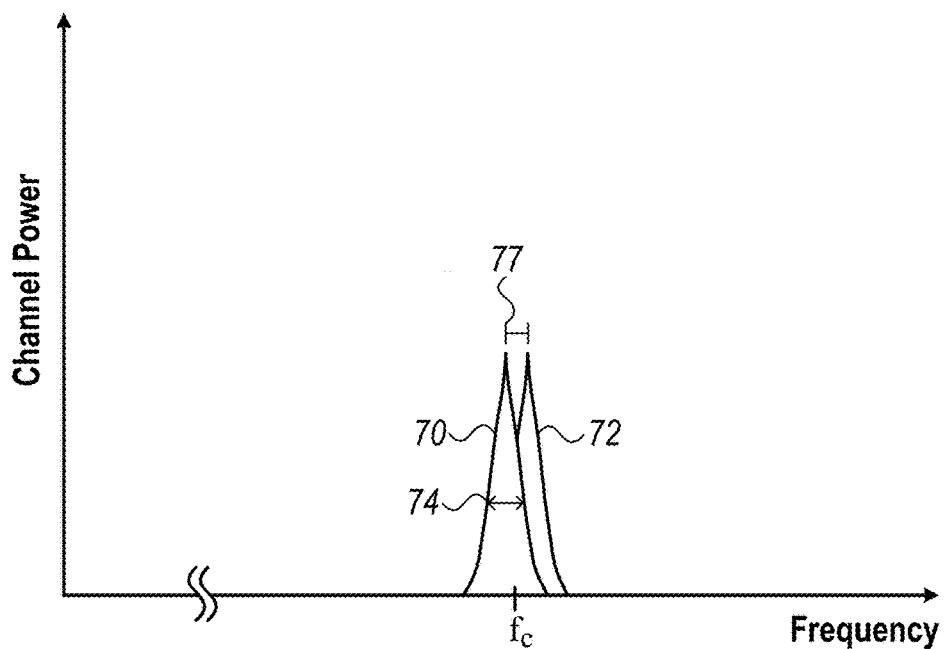
FIG. 4 is a graph that schematically shows a Doppler shift between a transmitted WLAN packet and its echo, in accordance with an embodiment that is described herein.

Using channel impulse response (CIR) characterization, a delay between a timing of a measured leakage tap 44 and a measured echo tap produced by human 28 is used by processor 11 to estimate the distance of human 28 from AP 20. The ability of AP 20 to detect and analyze echo 42, described in FIG. 4, is a prerequisite to estimate a range to human 28, and depends on the capability of AP 20 to identify micro-Doppler signatures of human 28.

As noted above, detection of micro-Doppler shifts requires zero drift and/or jitter between RF carrier frequencies of WLAN transmitter 24 and WLAN receiver 30. The zero drift and/or jitter in RF frequency is achieved using a single source of RF carrier frequency, embodied by a circuitry 52, that simultaneously drives the two circuitries with synchronized RF clock signals. Typically, circuitry 52 is realized using a single Voltage-Controlled Crystal Oscillator (VCXO) local oscillator (LO).

In some embodiments, the disclosed Wi-Fi radar is based on dual-band capabilities of AP 20 (i.e., capability to transmit and receive packets at two different carrier frequencies), which includes two transceivers in parallel, each comprising a WLAN transmitter and a WLAN receiver, such as WLAN transmitter 24 and WLAN receiver 30. For example, a first transceiver operates at a nominal carrier frequency of 5.5 GHz, while a second transceiver operates at a nominal carrier frequency of 2.4 GHz, with the two transceivers having a bandwidth of up to 160 MHz.

In some embodiments, using HE-LTF type NDP packets, WLAN receiver 30 estimates a Multiple-Input Multiple-Output (MIMO) N×N (e.g., 4×4=16 elements) channel configuration between a set of transmit and receive antennas of AP 20. A full rank wireless channel estimation is performed, mainly for a beamforming precoding MIMO matrix generation process. A MIMO CIR is estimated by WLAN receiver 30 for every NDP transmission to track movement of a target object and to estimate its Doppler shift.

Thus, MIMO is used for estimation of a direction and also for improving angular resolving power to separate between targets. The angular separation between targets improves with a larger product M×N of transmission and receiving channels. MIMO is also used to improve the tracking estimation of a target object and its Doppler shift estimate. Using MIMO gives an effect of SNR enhancement.

Using the HE-LTF NDP packet type, WLAN transmitter 24 provides training signals for a MIMO channel matrix per each carrier frequency used (e.g., 5.1 GHz and 5.9 GHz of a dual band AP 20), between all transmit and all receive circuitries, in order to enable channel estimation at all carrier frequencies used.

In an embodiment, in order to minimize the leakage signal (e.g., to nullify leakage signal), so as to reduce dynamic range requirements from the receive circuitry of the AP, a special antenna arrangement may be applied. In the disclosed antenna arrangement, the transmitting antennas are placed below the receiving antennas at the edges of the AP in order to maximize the distance between them. The antennas are designed to have minimal gain at the elevation angles around right angles on both the transmitter and the receiver elevations in order to reduce the transmitted and received leakage.

Some elements of AP 20, such as the beamforming module, may be implemented in hardware, e.g., in one or more Application-Specific Integrated Circuits (ASICs) or Field-Programmable Gate Arrays (FPGAs). Additionally or alternatively, some elements of the AP can be implemented using software, or using a combination of hardware and software elements.

In some embodiments, some of the functions of the AP, e.g., some or all of the functions of processor 11, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. In particular, processor 11 runs a dedicated algorithm as disclosed herein, including in FIG. 7, that enables processor 11 to perform the disclosed steps, as further described below.

Wi-Fi Radar Synchronization Hardware Solutions

Figure 2:
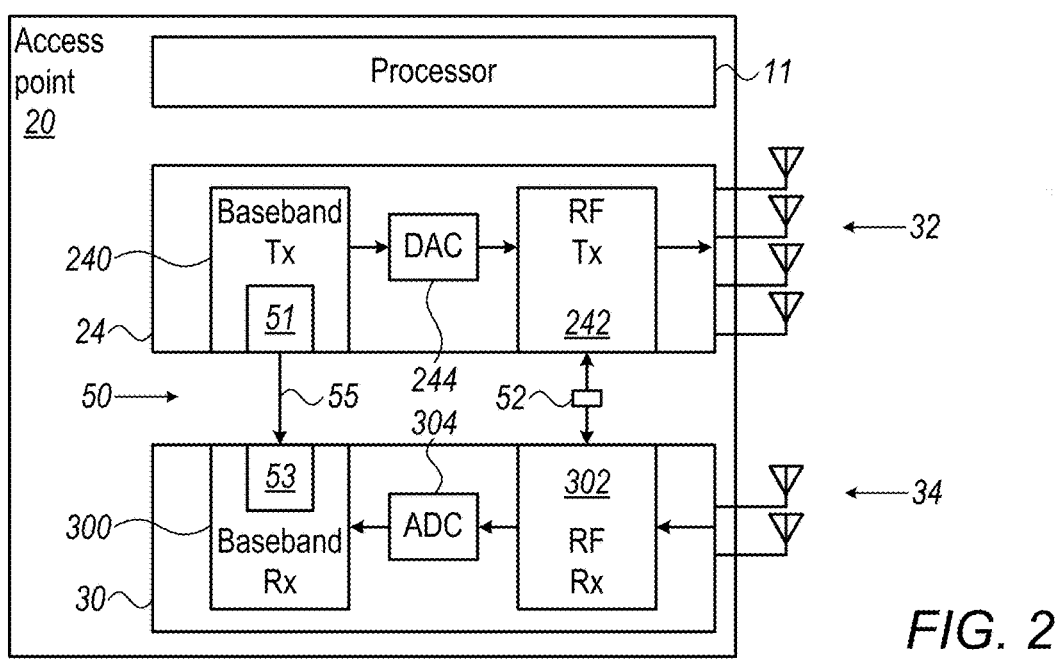
FIG. 2 is a detailed block diagram of the access point (AP) of FIG. 1 that schematically illustrates synchronization circuitries that enable the Wi-Fi radar capabilities of the AP, in accordance with an embodiment that is described herein.

FIG. 2 is a detailed block diagram of access point (AP) 20 of FIG. 1 that schematically illustrates synchronization circuitries 50 and 52 that enable the Wi-Fi radar capabilities of AP 20, in accordance with an embodiment that is described herein.

In some embodiments, synchronization circuitry 50 comprises an internal interface 51 of a baseband-signal transmit circuitry 240, an electrical interface 55, and an internal interface 53 of a baseband-signal receive circuitry 300. As baseband-signal transmit circuitry 240 generates a first NDP packet of a sequence, it also generates and sends a timing-synchronization signal 45 (seen in inset 25 of FIG. 1) from internal interface 51, over electrical interface 55, to internal interface 53 of baseband-signal transmit circuitry 300.

The timing-synchronization signal enables baseband-signal receive circuitry 300 to associate each returned echo with a transmitted packet that generated the echo. In this way, the time at which a leakage tap 44 arrives at the receive circuitry can be subtracted from the time when the respective echo arrives at the receive circuitry after being reflected off a target, to estimate the target distance from AP 20. Moreover, the one-to-one identification of a transmitted sequence of packets with the respective sequence of echoes enables processor 11 of AP 20 to accurately estimate micro-Doppler signatures, as described below.

Typically, leakage tap 44 time-delay is manifested as a fixed phase offset added to a measured phase between each transmitted packet and its echo. The phase offset is removed using calibration of the leakage tap between WLAN transmitter 24 and WLAN receiver 30. The calibration of the leakage tap is performed by a digital signal processor (DSP) that estimates a phase of the leakage 44 for each antenna and reduces it from each of received signals, such as echoes 42.

A change in gain of either the transmit or receive circuitries may change the fixed and zeroed phase offset. Thus, in embodiments of the disclosed technique, automatic gain control (not shown) is disabled in the AP by the DSP when performing radar processing and enabled when receiving communication packets. Any gain required for the Wi-Fi radar is set by the DSP in advance in one or more of the configurable amplifiers of the AP.

As noted above, to measure very low Doppler shifts, any carrier frequency drift and/or jitter between the transmit and receive circuitries has to be zeroed. In some embodiments, the zeroing of carrier frequency drift and/or jitter is achieved by driving an RF transmit circuitry 242 to an RF receive circuitry 302 with an identical carrier-frequency clock signal, using a single synchronization circuitry 52, typically by using one VCXO LO.

As further shown, a digital to analog converter (DAC) 244 converts the digital signal that baseband-signal transmit circuitry 240 outputs into an analog input for RF transmit circuitry 242, and an analog digital to converter (ADC) 304 converts the analog signal that RF receive circuitry 302 outputs into a digital input signal for baseband-signal receive circuitry 300 to analyze.

In an embodiment, synchronization circuitry 52 and RF transmit and RF receive circuitries 242 and 302 are integrated all on a same chip, which enables redistribution of the same RF clock signals among RF transmit and RF receive circuitries 242 and 300.

In an embodiment, if two (or more) nominal carrier frequencies are used, such as with a dual band AP 20, then each RF transmit and RF receive pair circuitries is fed by its own dedicated VCXO, meaning a dual band AP 20 includes two independent synchronization circuitries, such as circuitry 52. In another embodiment, a single pair of RF circuitries 242 and 300 can use two independent VCXOs with a multiplexer to select between them. This arrangement enables the AP to change the RF frequency of every given number of packets using a multiplexer circuitry in the AP.

For example, if the multiplexer is connected to five antennas, using two independent VCXOs allows at least two possible configurations of a Wi-Fi radar comprising three transmitting antennas 32 and two receiving antennas 34, or two transmitting antennas 32 and three receiving antennas 34.

Estimation of Range of Target

Figure 3:
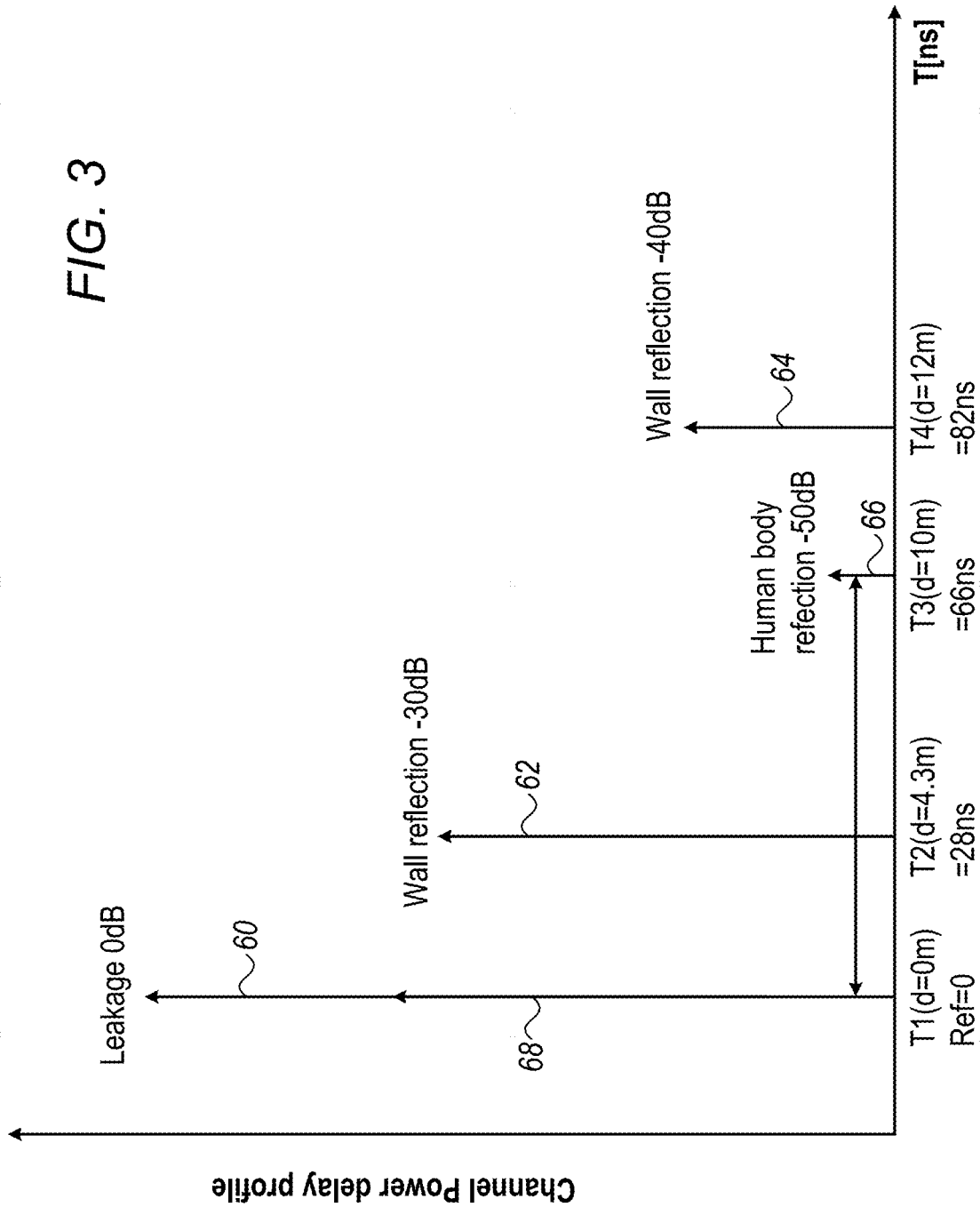
FIG. 3 is a graph that schematically shows a channel power delay time profile that is indicative of a target range, in accordance with an embodiment that is described herein.

FIG. 3 is a graph of a channel power delay time profile that is indicative of a target range, in accordance with an embodiment that is described herein. As seen, using the timing-synchronization signal, delay tap of leakage signal 44 is calibrated by the DSP to zero, meaning that a strong (0 dB) leakage signal 60 occurs at a time T1=0.

A net delay time (i.e., delay-tap-removed delay time), $\tau$, between a time at which a packet is transmitted and its echo measured directly, yields a distance r, to a target from which the echo packet is reflected. Distance r is calculated as r=τc/2, with c being speed of light.

The ranging accuracy (e.g., resolution) is a function of the Wi-Fi bandwidth (BW) and is given by Δr=c/(2BW). For a bandwidth of 160 MHz, a coarse resolution of 94 centimeters can be obtained.

In an embodiment, the accuracy of the measurement of range is refined by using two different nominal carrier frequencies and sweeping carrier frequencies $f_{c1}$ and $f_{c2}$ about each of the nominal values to derive a set of possible ranges, $r(f_{c1})$ and $r(f_{c2})$, all of which fall within the above coarse resolution limit, Δr. The fine resolution is derived by minimizing the distance-difference between the various possible $r(f_{c1})$ and $r(f_{c2})$, i.e., by obtaining $\min\{r(f_{c1})-r(f_{c2})\}$, and extracting a best matching common distance solution, r'.

In some embodiments, the target resolution (ranging accuracy) can be improved by applying interpolation to the estimated CIR. One example for interpolation is to apply zero padding to the channel impulse response before transforming it into time-domain CIR.

In FIG. 3, a detected strong peak at a net delay time τ=T2=28 nS gives a distance of r'=4.3 meters from a first wall. As seen, the wall generates a relatively strong reflection 62 of −30 dB. A net delay time T4=82 nS gives a distance of 12 meters from a second wall having a reflection signal 64 of −40 dB. Finally, a net delay time T3=66 nS gives a distance of 10 meters from a human, having a weak reflection signal 66 of −50 dB.

As can be seen in FIG. 3, reflections from the surroundings (e.g., walls) are much stronger than the human reflection and may well mask the human reflection unless the small human reflection is identified (e.g., against a strong background) using its micro-Doppler signature.

Furthermore, the small human reflection must be identified against strong leakage signal 60. In an embodiment, the leakage signal is reduced to an amplitude 68, for example to −25 dB, by the DSP applying a nulling matrix to the channel. The nulling matrix is based on the estimated channel leakage. Using more transmitter antennas relative to the number of receive antenna can reduce a greater amplitude 68 of the leakage signal, as more transmit antennas can create a larger destructive interference effect at the receive antenna.

Estimation of Doppler Signature of Target

FIG. 4 is a graph that schematically shows a Doppler shift 77 between a transmitted WLAN packet 70 and its echo 72, in accordance with an embodiment that is described herein. The Doppler effect is used herein in order to identify a moving target (e.g., a moving human) having a small RCS compared to its static surroundings (e.g., walls of a room) by identifying a micro-Doppler signature of the target.

The Doppler shift is indicative of a velocity component that is directed to or from AP 20 ("radial velocity"). The existence of such a velocity component of a target can be identified, and the velocity component estimated in principle, by determining a non-zero frequency difference (i.e., Doppler shift) between the carrier-frequency of transmitted packet 70 and that of its echo packet 72.

In the disclosed Doppler shift model, $f_c$ is the carrier-frequency, which can be in the 2.4 GHz band or in the 5.5 GHz band, $V_{target}$ is the speed of the target and c is the speed of light.

The Doppler shift (77) $f_D$ is given, to a very good approximation, by $$f_D = 2f_c \frac{V_{target}}{c}.$$

For a typical target speed of 1 meter/sec, Doppler shift 77 is 40 Hz.

However, compared with a packet bandwidth 74 of few tens of MHz, the chances to detect a moving target using a single packet are very remote, as the Doppler detection is required to resolve a shift with a power of $10^{-6}$.

In some embodiments, the problem is resolved by processor 11 applying spectral analysis to sequences of echoes of coherent sequences of packets, with such a sequence comprising a number N of equally spaced-in-time WLAN packets, typically in the range of N=1000 to N=10,000. Spectral analysis effectively enhances the AP 20 resolving power of the Doppler of AP 20 by a factor of approximately $10 \cdot \log_{10}(N/2)$.

Estimation of Direction of Target

Estimation of a direction, sin(θ), of a target relative to AP 20 is done utilizing at least part of the echo signals that are acquired for estimating range and for identifying a micro-Doppler signature. Estimation of a direction using echo signals is done by WLAN receiver 30 measuring a signal of each packet received simultaneously by two or more AP 20 antennas that form an antenna array. Methods to estimate a direction of WLAN signals using an array of antennas may include using algorithms, such as multiple signal classification (MUSIC), or other existing or new algorithms for that purpose.

Simulated Wi-Fi Radar Detection Space

Figure 5:
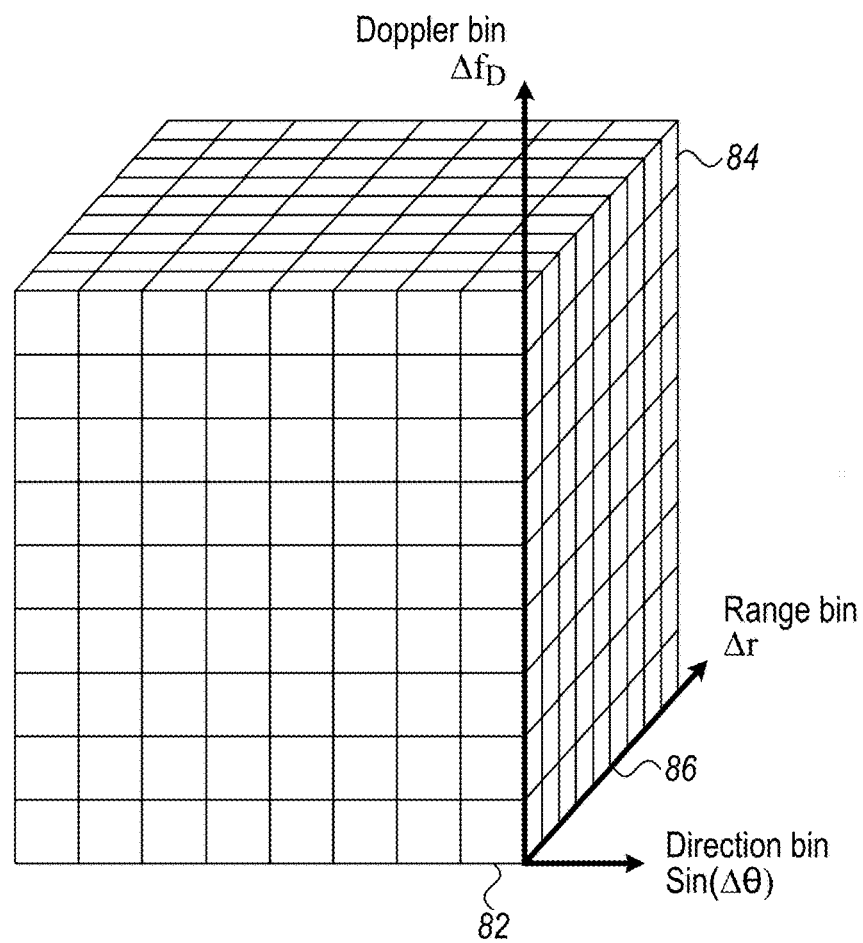
FIG. 5 is a graph the schematically illustrates a Wi-Fi radar detection space, in accordance with an embodiment that is described herein.

FIG. 5 is a graph that schematically illustrates a Wi-Fi radar detection space, in accordance with an embodiment that is described herein. As described above, AP 20 receives reflected echoes, and extracts the direction, Doppler signature, and range of reflecting objects in a designated area. Processor 11 of AP 20 organizes these in a three-dimensional matrix termed "radar detection space."

As seen, the radar detection space has three dimensions:
1. Direction (82)
2. Doppler shift (84)
3. Range (86)

In some embodiments, processor 11 searches for signal peaks inside the shown three-dimensional matrix. Each peak should be sufficiently higher than the noise, (e.g., having a signal to noise ratio (SNR) value above a prespecified SNR threshold value in dB) to be considered a possible target.

The inventors have evaluated the embodiments described above using computer simulations, the goal being the detection of a human walking in a room at a speed of one meter per second.

Figure 6:
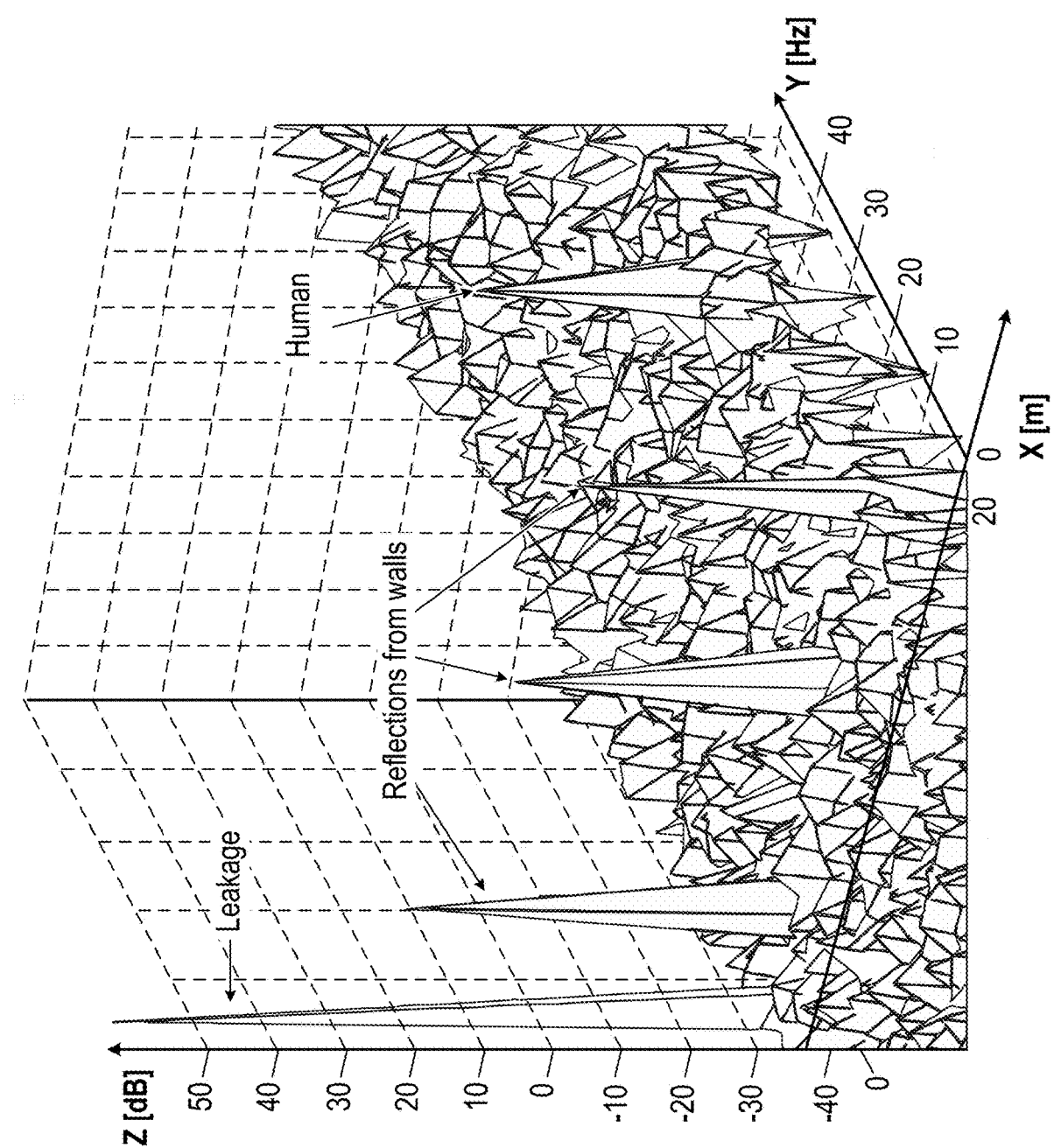
FIG. 6 is a computer simulation of human detection using Wi-Fi radar, in accordance with an embodiment that is described herein.

FIG. 6 is a computer simulation of human detection using Wi-Fi radar, in accordance with an embodiment that is described herein. The simulation includes the transmission of N=1024 packets that are received within a period of one second. A room reflection model was established to create the CIR for each packet and a typical human RCS was used. Noise was added to the CIR to simulate a strong leakage signal with an SNR of about 100 dB. A spectral analysis comprising 1024 FFT was performed on each of the channel taps in the time domain. The result shown in FIG. 6 is a 3D plot where the x-axis is the range, y-axis the Doppler frequency shift, and z-axis the echo power.

As seen, FIG. 6 shows at a y-axis value of 40 Hz, a weak (−50 dB relative to leakage) signal, which is still distinctive one (having 50 dB SNR), and which constitute a detection of the human.

Wi-Fi Radar Detection Method

Figure 7:
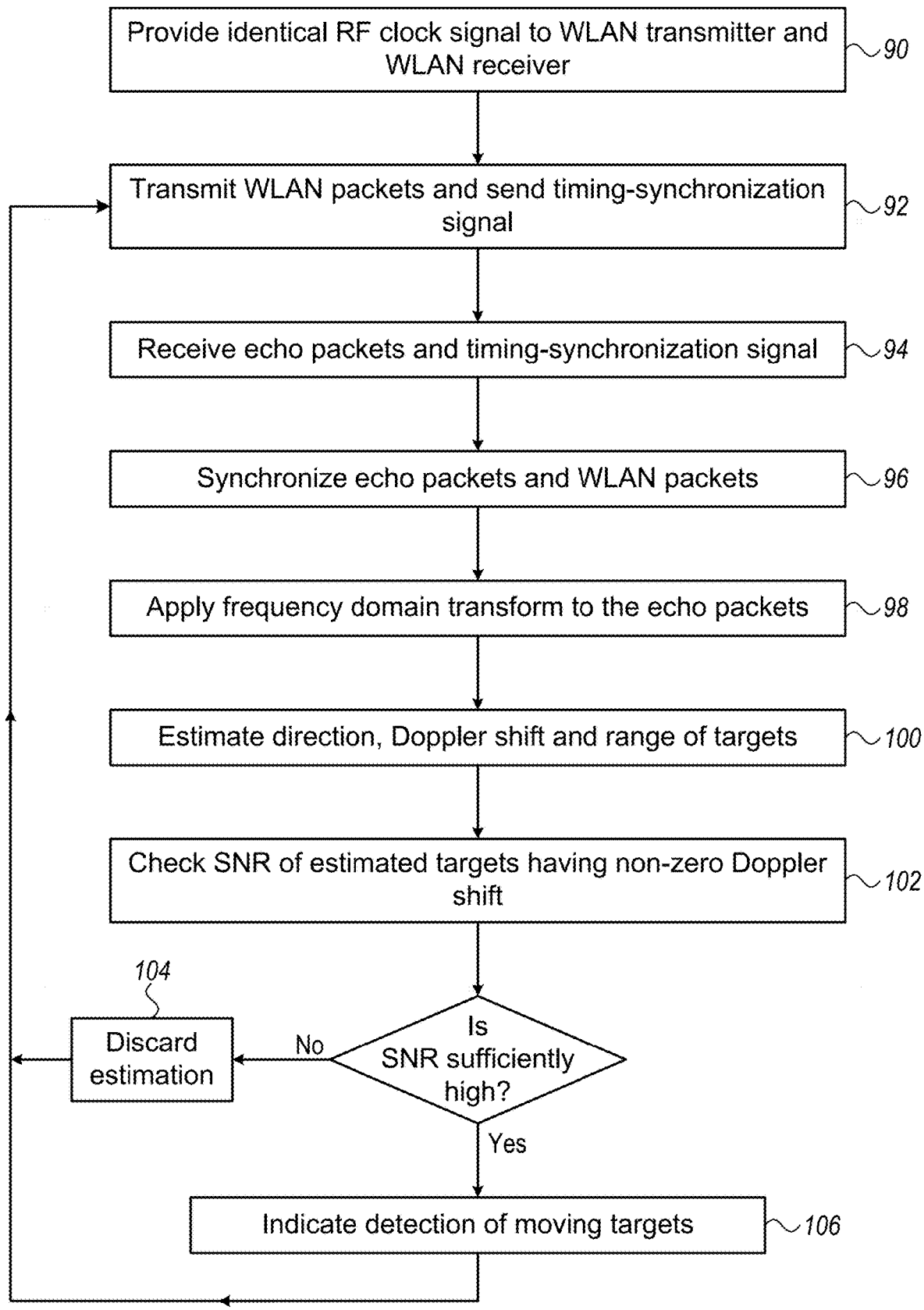
FIG. 7 is a flow chart that schematically illustrates a method for human detection using Wi-Fi radar, in accordance with an embodiment that is described herein.

FIG. 7 is a flow chart that schematically illustrates a method for human detection using Wi-Fi radar, in accordance with an embodiment that is described herein. The algorithm according to the presented embodiment carries out a process that begins with synchronization circuitry 52 of AP 20 providing identical RF clock signals (i.e., identical frequency-reference signals) to both WLAN transmitter 24 and WLAN receiver 30, at an RF clock synchronization step 90. At a packet transmission step 92, WLAN transmitter 24 transmits WLAN packets, such as a sequence of equally spaced-in-time NDP packets, and sends a timing-synchronization signal to WLAN receiver 30.

At an echo receiving step 94, WLAN receiver 30 receives the echo packets and the timing-synchronization signal. Using the timing-synchronization signal, processor 11 of AP 20 synchronizes the echo packets with the WLAN packets, at a digital synchronization step 96. Next, processor 11 applies the above-described methods to estimate a direction, Doppler shift, and range of various targets, at a Wi-Fi radar detection step 100. At an SNR estimation step 102, processor 11 compares the SNR of estimated targets having a non-zero Doppler shift (e.g., a distinctive Doppler shift) to a prespecified SNR threshold value.

If the SNR is insufficiently high, the processor drops the estimation, at an estimation discarding step 104, and the process loops back step 92, to acquire and analyze a new data set comprising echo packets.

If the SNR is sufficiently high, the processor indicates the detection of one or more moving targets, at a moving target indication step 106, and the process loops back step 92, to acquire and analyze a new data set comprising echo packets. The indication may be provided by audiovisual means, for example, on a display and/or as an audio alarm.

The system and AP configurations described above are given by way of example, and any other suitable embodiments can also be used. For example, although the embodiments above refer to the use of a single AP, multiple APs can be used in order, for example, to improve coverage and accuracy.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Wireless Local-Area Network (WLAN) access point, comprising:
   a WLAN transmitter, configured to transmit WLAN packets, comprising both communication packets and channel-sounding packets, via one or more transmit antennas, and to send a timing-synchronization signal over an internal interface;
   a WLAN receiver, configured to receive, via one or more receive antennas, echo packets comprising reflections from an object of a selected subset of the WLAN packets transmitted by the WLAN transmitter, to receive the timing-synchronization signal from the WLAN transmitter over the internal interface, and to time-synchronize the echo packets and the corresponding WLAN packets using the timing-synchronization signal; and
   a processor, configured to estimate one or more parameters of the object based on the channel-sounding packets and on the time-synchronized echo packets corresponding to the channel-sounding packets, and to output the estimated parameters to a user.

2. The access point according to claim 1, further comprising a frequency source configured to generate at least one frequency-reference signal, and to provide the frequency-reference signal to both the WLAN transmitter and the WLAN receiver, wherein the WLAN transmitter and the WLAN receiver are configured to frequency-synchronize to one another using the frequency-reference signal.

3. The access point according to claim 2, wherein the frequency source is configured to sweep the at least one frequency-reference signal and estimate one or more parameters of the object based on the at least one swept frequency-reference signal.

4. The access point according to claim 1, wherein the WLAN transmitter is configured to transmit the communication packets interleaved between the channel-sounding packets.

5. The access point according to claim 1, wherein the WLAN transmitter is configured to transmit a sequence of the channel-sounding packets at regular time intervals, and wherein the processor is configured to estimate the parameters of the object by applying a frequency-domain transform to the echo packets corresponding to the sequence of the channel-sounding packets.

6. The access point according to claim 1, wherein the WLAN receiver is configured to receive WLAN communication packets from one or more WLAN stations (STAs), interleaved between the echo packets.

7. The access point according to claim 1, wherein the one or more parameters of the object comprise at least one parameter of the object, selected from the group of parameters consisting of range, direction and velocity.

8. A Wireless Local-Area Network (WLAN) access point, comprising:
   a WLAN transmitter, configured to transmit WLAN packets via one or more transmit antennas, and to send a timing-synchronization signal over an internal interface;
   a WLAN receiver, configured to receive, via one or more receive antennas, echo packets comprising reflections from an object of a selected subset of the WLAN packets transmitted by the WLAN transmitter, to receive the timing-synchronization signal from the WLAN transmitter over the internal interface, and to time-synchronize the echo packets and the corresponding WLAN packets using the timing-synchronization signal; and
   a processor, configured to estimate one or more parameters of the object based on the time-synchronized echo packets and WLAN packets, including estimating a distance between the access point and the object by:

for a given WLAN packet transmitted by the WLAN transmitter, identifying (i) an echo packet received from the target in response to the given WLAN packet, and (ii) a direct leakage of the given WLAN packet from the WLAN transmitter to the WLAN receiver;

measuring a time delay between the echo packet and the direct leakage; and estimating the distance based on the time delay, and to output the estimated parameters to a user.

9. A method for communication in a Wireless Local-Area Network (WLAN) access point, the method comprising:

in a WLAN transmitter of the access point, transmitting WLAN packets, comprises both communication packets and channel-sounding packets, via one or more transmit antennas, and sending a timing-synchronization signal over an internal interface;

in a WLAN receiver of the access point, receiving echo packets comprising reflections from an object of a selected subset of the WLAN packets transmitted by the WLAN transmitter and the timing-synchronization signal, and time-synchronizing the echo packets and the corresponding WLAN packets using the timing-synchronization signal; and estimating one or more parameters of the object based on the channel-sounding packets and on the time-synchronized echo packets corresponding to the channel-sounding packets, and outputting the estimated parameters to a user.

10. The method according to claim 9, wherein estimating the one or more parameters comprises estimating a distance between the access point and the object by:

for a given WLAN packet transmitted, identifying (i) an echo packet received from the target in response to the given WLAN packet, and (ii) a direct leakage of the given WLAN packet;

measuring a time delay between the echo packet and the direct leakage; and estimating the distance based on the time delay.

11. The method according to claim 9, and comprising generating at least one frequency-reference signal, and providing the frequency-reference signal to the WLAN transmitter and the WLAN receiver so as synchronize transmitted WLAN packets and received echoes one another using the frequency-reference signal.

12. The method according to claim 11, wherein generating the at least one frequency-reference signal comprises sweeping the at least one frequency-reference signal, and wherein estimating the one or more parameters comprises estimating the one or more parameters of the object based on the at least one swept frequency-reference signal.

13. The method according to claim 9, wherein transmitting the WLAN packets comprises transmitting the communication packets interleaved between the channel-sounding packets.

14. The method according to claim 13, wherein transmitting the WLAN packets comprises transmitting a sequence of the channel-sounding packets at regular time intervals, and wherein estimating the parameters of the object comprises applying a frequency-domain transform to the echo packets corresponding to the sequence of the channel-sounding packets.

15. The method according to claim 9, wherein the WLAN communication packets are interleaved between the echo packets.

16. The method according to claim 9, wherein the one or more parameters of the object comprise at least one parameter of the object, selected from the group of parameters consisting of range, direction and velocity.

* * * * *